US006979776B1

(12) United States Patent
Zimmermann

(10) Patent No.: US 6,979,776 B1
(45) Date of Patent: Dec. 27, 2005

(54) PIPE BUNDLE FOR UNDERGROUND INSTALLATION

(75) Inventor: Paul Michael Zimmermann, New Orleans, LA (US)

(73) Assignee: Entergy Louisiana, Inc., New Orleans, LA (US)

( * ) Notice: Subject to any disclaimer, the term of this patent is extended or adjusted under 35 U.S.C. 154(b) by 0 days.

(21) Appl. No.: 10/965,356

(22) Filed: Oct. 14, 2004

(51) Int. Cl.[7] .......... H02G 3/04

(52) U.S. Cl. .......... 174/48; 174/37; 174/72 R; 138/111; 405/154.1

(58) Field of Search .......... 174/48, 37, 21 R, 174/28, 65 R, 68.3, 72 R, 72 TR, 95, 96, 174/15.1, 15.6, 19, 45 R, 47, 72 C, 49; 138/112, 138/44, 111, 113; 285/123.2, 222.1, 120.1, 285/121.1, 123.1, 149.1, 150.1, 152.1; 385/134, 385/135, 109; 254/134.3 FT, 134.3 R; 405/184.3, 405/154.1

(56) References Cited

U.S. PATENT DOCUMENTS 3,567,268 A * 3/1971 Peterson .......... 254/134.3 R
3,604,731 A 9/1971 Petersen
3,699,692 A 10/1972 Smith
3,787,016 A 1/1974 Laval, Jr.
3,806,630 A * 4/1974 Thompson et al. .......... 174/37
3,978,275 A 8/1976 Ishihara et al.
4,101,114 A * 7/1978 Martin et al. .......... 254/134.3 FT
4,162,865 A * 7/1979 Aubet .......... 174/37
4,199,009 A * 4/1980 Ballone .......... 138/112
4,288,107 A * 9/1981 Schwartze .......... 285/123.2
4,366,939 A 1/1983 McMillan
4,385,021 A * 5/1983 Neeley .......... 174/47
4,411,409 A * 10/1983 Smith .......... 254/134.3 FT
4,615,646 A 10/1986 Langner
4,620,818 A 11/1986 Langner
4,671,702 A 6/1987 Langner
4,692,731 A * 9/1987 Osinga .......... 174/114 R
4,804,020 A * 2/1989 Bartholomew .......... 138/111
4,843,713 A 7/1989 Langner et al.
4,979,296 A 12/1990 Langner et al.
5,027,864 A * 7/1991 Conti et al. .......... 174/68.3
5,234,198 A 8/1993 Hale et al.
5,388,867 A * 2/1995 Szekely .......... 285/222.1
5,392,815 A * 2/1995 Stuart .......... 138/44
5,426,577 A * 6/1995 Gordin et al. .......... 174/45 R
5,725,028 A * 3/1998 Cleland .......... 138/111
5,979,506 A 11/1999 Aarseth
6,012,495 A * 1/2000 Antonsen .......... 174/47

(Continued)

FOREIGN PATENT DOCUMENTS

EP 0785387 7/1997

OTHER PUBLICATIONS

D.J. Miller: "An American-Made Highway Bore," Power & Communication Contractor, Feb. 2002.

(Continued)

*Primary Examiner*—Angel R. Estrada
(74) *Attorney, Agent, or Firm*—J. Charles Dougherty

(57) ABSTRACT

A pipe conduit bundle for installation into a wellbore using horizontal drilling techniques is disclosed. The pipe conduit does not require an outer casing for construction. The pipe bundle configuration is formed by pipes of varying sizes in a particular configuration, with bindings interspaced along the length of the pipes such that the pipe bundle deflects as a single unit during installation. A pulling head is attached to the bundle, which is hollow to allow liquid entering one pipe to be distributed to other pipes. Liquids such as water may be used to fill the pipes to reduce buoyancy, and thereby reduce drag, during installation of the bundle.

18 Claims, 7 Drawing Sheets

U.S. PATENT DOCUMENTS

| | | | | |
|---|---|---|---|---|
| 6,101,304 | A * | 8/2000 | Quistorff et al. | 385/109 |
| 6,140,586 | A * | 10/2000 | Imani | 174/72 C |
| 6,267,537 | B1 | 7/2001 | Breivik et al. | |
| 6,332,595 | B1 | 12/2001 | Klucznik | |
| 6,357,966 | B1 | 3/2002 | Thompson | |
| 6,702,520 | B2 * | 3/2004 | Paletta | 405/184.3 |
| 6,774,311 | B1 * | 8/2004 | Byun | 174/48 |
| 6,796,547 | B1 * | 9/2004 | Washburn | 254/134.3 FT |
| 2003/0026662 | A1 | 2/2003 | Vidal et al. | |
| 2003/0103811 | A1 | 6/2003 | Grimseth | |

OTHER PUBLICATIONS

Doug Allman: "Multiple Conduit Pullbacks in Drilling Extremes," Case Studies, River Crossings, Environmental Crossings, Inc., http://www.ecihdd.com/20rivercrossing-.htm.

Installation of Pipelines by Horizontal Directional Drilling, an Engineering Design Guide, Offshore and Onshore Design Applications Supervisory Committee, Pipeline Research Committee, American Gas Association, Apr. 15, 1995.

* cited by examiner

| COEFFICIENT OF SOIL FRICTION | FLUIDIC DRAG ( PSI ) | MAXIMUM PULLING LOAD REQUIRED ( KIPS ) | |
|---|---|---|---|
| | | | |
| 0.10 | 0.010 | 264.13 | |
| 0.10 | 0.020 | 320.43 | |
| 0.10 | 0.030 | 376.74 | |
| 0.10 | 0.040 | 433.05 | |
| 0.10 | 0.050 | 489.36 | |
| 0.10 | 0.060 | 545.68 | |
| 0.10 | 0.070 | 602.00 | DOES NOT MEET DESIGN CRITERIA |
| | | | |
| 0.20 | 0.010 | 425.94 | |
| 0.20 | 0.020 | 483.16 | |
| 0.20 | 0.030 | 540.39 | |
| 0.20 | 0.040 | 597.63 | DOES NOT MEET DESIGN CRITERIA |
| | | | |
| 0.30 | 0.010 | 594.39 | DOES NOT MEET DESIGN CRITERIA |

FIG.5

| COEFFICIENT OF SOIL FRICTION | FLUIDIC DRAG ( PSI ) | MAXIMUM TENSION REQUIRED ( KIPS ) | |
|---|---|---|---|
| | | | |
| 0.10 | 0.010 | 171.97 | |
| 0.10 | 0.020 | 228.28 | |
| 0.10 | 0.030 | 284.59 | |
| 0.10 | 0.040 | 340.92 | |
| 0.10 | 0.050 | 397.24 | |
| 0.10 | 0.060 | 453.57 | |
| 0.10 | 0.070 | 509.91 | |
| 0.10 | 0.080 | 566.24 | DOES NOT MEET DESIGN CRITERIA |
| | | | |
| 0.20 | 0.010 | 260.00 | |
| 0.20 | 0.020 | 317.24 | |
| 0.20 | 0.030 | 374.48 | |
| 0.20 | 0.040 | 431.74 | |
| 0.20 | 0.050 | 489.00 | |
| 0.20 | 0.060 | 546.26 | |
| 0.20 | 0.070 | 603.53 | DOES NOT MEET DESIGN CRITERIA |
| | | | |
| 0.30 | 0.010 | 351.37 | |
| 0.30 | 0.020 | 409.64 | |
| 0.30 | 0.030 | 467.91 | |
| 0.30 | 0.040 | 526.20 | |
| 0.30 | 0.050 | 584.49 | DOES NOT MEET DESIGN CRITERIA |
| | | | |
| 0.40 | 0.010 | 446.63 | |
| 0.40 | 0.020 | 506.04 | |
| 0.40 | 0.030 | 565.47 | DOES NOT MEET DESIGN CRITERIA |
| | | | |
| 0.50 | 0.010 | 546.46 | |
| 0.50 | 0.020 | 607.15 | DOES NOT MEET DESIGN CRITERIA |

FIG. 6

| COEFFICIENT OF SOIL FRICTION | FLUIDIC DRAG ( PSI ) | MAXIMUM TENSION REQUIRED ( KIPS ) | |
|---|---|---|---|
| 0.10 | 0.010 | 131.44 | |
| 0.10 | 0.020 | 187.76 | |
| 0.10 | 0.030 | 244.10 | |
| 0.10 | 0.040 | 300.43 | |
| 0.10 | 0.050 | 356.77 | |
| 0.10 | 0.060 | 413.12 | |
| 0.10 | 0.070 | 469.46 | |
| 0.10 | 0.080 | 525.80 | |
| | | | |
| 0.20 | 0.010 | 187.01 | |
| 0.20 | 0.020 | 244.27 | |
| 0.20 | 0.030 | 301.54 | |
| 0.20 | 0.040 | 358.82 | |
| 0.20 | 0.050 | 416.10 | |
| 0.20 | 0.060 | 473.38 | |
| 0.20 | 0.070 | 530.67 | |
| 0.20 | 0.080 | 587.96 | DOES NOT MEET DESIGN CRITERIA |
| | | | |
| 0.30 | 0.010 | 244.45 | |
| 0.30 | 0.020 | 302.75 | |
| 0.30 | 0.030 | 361.06 | |
| 0.30 | 0.040 | 419.38 | |
| 0.30 | 0.050 | 477.70 | |
| 0.30 | 0.060 | 536.02 | |
| 0.30 | 0.070 | 594.35 | DOES NOT MEET DESIGN CRITERIA |
| | | | |
| 0.40 | 0.010 | 304.08 | |
| 0.40 | 0.020 | 363.53 | |
| 0.40 | 0.030 | 422.99 | |
| 0.40 | 0.040 | 482.46 | |
| 0.40 | 0.050 | 541.93 | |
| 0.40 | 0.060 | 601.41 | DOES NOT MEET DESIGN CRITERIA |
| | | | |
| 0.50 | 0.010 | 366.27 | |
| 0.50 | 0.020 | 427.00 | |
| 0.50 | 0.030 | 487.75 | |
| 0.50 | 0.040 | 548.50 | |
| 0.50 | 0.050 | 609.25 | DOES NOT MEET DESIGN CRITERIA |

FIG.7

PIPE BUNDLE FOR UNDERGROUND INSTALLATION

BACKGROUND OF THE INVENTION

The present invention relates to underground conduits, and specifically relates to multiple pipes used as conduits wherein the pipes are installed together without an outer casing.

Transmission cables of various sorts are ubiquitous throughout the world's developed countries. Such cables include electrical power transmission lines as well as various types of communications cables, such as co-axial cable and fiber optic cable. When installed above ground, these cables will typically be carried along poles or towers in order to avoid contact between the cables and persons or objects at ground level. Above-ground installations are often not practical, however, in crowded urban environments. Above-ground installations also increase the risk that the cables will be damaged or destroyed, such as by falling trees or other objects, or by high winds or other weather-related causes. Finally, above-ground installations are generally considered unsightly, and thus are disfavored by the public. For these reasons, underground cable installation is generally displacing above-ground placement, particularly in urban and sub-urban areas.

Another option for cable placement, applicable where the obstacle to be overcome is a body of water, is submarine cabling. A submarine cable is simply laid on the floor of the body of water, often with an extra protective coating over the cable to protect from impacts or abrasions. Submarine cables are commonly used in ocean crossings and in connections between offshore platforms and the mainland. Submarine cables may not, however, be practical where the body of water to be crossed has a significant mono-directional current, as in the case of a swift river. Also, submarine cabling may not be practical when a crossing is required at a location that includes existing submarine cabling, pipes, or other such obstacles. Finally, submarine cabling may not be practical where the characteristics of the cables themselves, such as the magnetic and electric fields produced by the cables, may interfere with passing vessels or other submarine cables, pipes, or installations.

When a cable is to be laid across land and above-ground installations are found to be impractical, the alternative approach is underground cabling. The usual method of installing underground cables is to dig a trench in which the cable will be laid. The cable is often installed within a conduit in order to protect the cable from damage through contact with water or soil. Installation of cable conduit using the trenching method is relatively straightforward, but may be difficult or impossible in certain applications. Environmental issues may prevent the use of trenching, such as when a cable is to cross an environmentally-protected area such as a wetland or a beach. There are also circumstances in which trenching is simply not feasible, such as when a cable is to be installed under a body of water such as a river or lake. Trenching is also impractical, or at least prohibitively expensive, in some highly urbanized areas. If a cable is to be installed in an underground manner in these circumstances, an alternative to trenching must be considered.

The past decade has seen significant advances in the field of Horizontal Directional Drilling (HDD). HDD is a "trenchless" technique that allows for the construction of a relatively long underground tunnel through which a conduit may be pulled for an underground cable installation. Modern HDD equipment allows the user to construct a tunnel that, within certain limits, may twist and turn in order to avoid obstacles and place conduit through a desired path. This technique is thus ideal to pass conduits under rivers, lakes, highways, and the like, and is also employed on occasion to avoid trenching in highly-developed urban areas.

Although there are alternative "trenchless" methods for passing cables over waterways, such as the placement of conduits on the river bed or passing conduits over bridges that cross the waterway, HDD offers a number of advantages over these techniques. First, HDD allows a tunnel to be placed with great precision since the location and direction of the drilling head may be monitored and adjusted as the drilling operation is underway. HDD also allows the conduit to be placed at a sufficient depth that avoidance of other utility lines and other artificial obstacles is assured. Since HDD allows placement of conduit underground, the possible obstruction of a waterway or the possibility of damage to the conduit from passing watercraft is eliminated. Finally, since only the termination points on the HDD-installed cable are above ground, the technique requires only a relatively small amount of surface land for implementation, which may result in cost efficiencies as well as a lessening of the environmental impact of the construction.

A typical HDD process involves three main stages. The first stage is the drilling of a pilot hole, which in the case of a riverbed installation will pass from one bank of the river to the other. Often, an area must be built up or cleared in order to provide for the termination points at each river bank. The second stage is pilot hole enlargement, during which cutting heads are employed to enlarge the diameter of the wellbore pilot hole so that it will be sufficient to receive the desired conduit. Where significant enlargement is required, successively larger cutters may be employed in sequential fashion. A fluid is typically directed over the boring tool and back up through the wellbore in order to remove dirt and any other cut materials from the space. The final step is pullback installation of the conduit itself. In this step, the drilling pipe, which has reached the opposite bank from which it started, has the conduit attached in order to pull the conduit back through the wellbore. It may be noted that the wellbore is typically filled with a drilling mud or similar material in order to prevent collapsing until the conduit is in place.

In drilling the pilot hole, a boring system is situated on the ground surface and drills a hole into the ground at an oblique angle with respect to the surface. After the boring tool reaches a desired depth, such as beneath a riverbed, the tool may then be directed along a substantially horizontal path to create a horizontal wellbore. After the desired length of wellbore has been obtained, the tool is then directed upwards to break through to the earth's surface on the opposite bank. Thus the angle that the drilling head forms with the ground surface often starts out relatively severe, then flattens for a period as the obstacle, such as a river, is avoided, then rises more severely near the exit.

In a simple application such as the passing of a small conduit under a roadbed, the pilot hole may be sufficiently large that no enlargement step is required. In applications involving large conduits or multiple conduits, however, it will be necessary to use successively larger cutters in order to create a wellbore of the proper diameter. Alternatively, a reamer or swab may be employed in addition to the cutter, such that the reamer is attached to the drill string and is pulled back through the wellbore, thus reaming out the wellbore to a larger diameter, or smoothing the wellbore to make the desired diameter more regular within the wellbore. To place the conduit, it may be attached to the drill pipe after hole enlargement so that it is dragged through the wellbore and returned to the drilling rig.

A special problem related to large-scale HDD projects is the use of multiple conduits presented through the same wellbore. Installation of multiple conduits using a trenching approach presents little problem, as the conduits may simply be laid side-by-side, or alternatively in layers, within the trench. The size of the trench is thus adjusted to ensure that the conduits may be accommodated along with the desired spacing between conduits, as appropriate for the type of cables to be passed within the conduits. Since HDD techniques require pulling of conduit through the drilled tunnel, however, the use of multiple conduits create additional engineering problems due to the stresses and strains that result from the pulling of multiple conduits simultaneously.

HDD techniques have been applied to certain types of installations of multiple conduits through a single tunnel passing underneath rivers and waterways. These techniques have been applied where relatively small conduits are to be placed, such as a series of four-inch inside diameter (ID) high-density polyethylene (HDPE) conduits for carrying fiber optic communications cables. The pipes may simply be attached to the HDD drill rig and drawn simultaneously through the tunnel for placement. Because of the small size of the conduits used, no special problems are encountered for conduit placement in these conduit clusters that are not encountered when placing a single conduit.

The application of HDD technology to the installation of multiple larger conduits, however, presents special problems that have not been addressed in applications involving groups of smaller conduits. As pipe sizes become larger, simply pulling the pipes in a group back through the wellbore will not be possible because of the drag created as the pipes are pulled through the wellbore. This is particularly true when HDPE pipes are used. It should be noted that metal pipes cannot be used in certain applications because conducting materials such as metals will interfere with the operation of communications signals passing through coaxial cables. Metals also may not be used in certain applications involving the laying of electrical transmission and distribution lines.

The drag imparted upon conduits during placement in a wellbore are of two varieties: fluidic drag, and friction between the conduit or conduit group and the wellbore wall. Fluidic drag results from the fill material that is pumped into the wellbore during pipe placement; this material typically being a bentonite-based mud. The fluidic drag created depends upon the viscosity and density of the mud, the geometry of the pipe or pipe group, the Reynolds number of the conduit material, and the speed at which the conduit group is pulled. Since the drag on the conduit is proportional to the square of the speed at which the conduit is pulled, pull speed is an important factor in limiting fluidic drag. The friction between the conduit and the soil or wellbore wall depends upon the normal force acting on the group and the coefficient of friction of the wellbore wall.

One potential solution to the problem of multiple large pipes pulled through a wellbore is to add an outer pipe or casing. This solution has been commonly applied to applications such as undersea pipelines and offshore oil rig supply cables. The use of a casing serves to protect the inner pipes and cables from damage, and prevents them from becoming entangled as may occur if they were laid separately. European patent application no. 785,387 to Koninklijke PTT Nederland N.V. teaches an example of a method of installing a group of communications cable conduits within an outer casing.

While the use of a strong outer casing would solve some of the problems related to the installation of a group of larger pipes within a wellbore, the use of such a casing would significantly increase the cost of the installation project. Not only would the cost of the casing itself be a factor, but the use of a casing would require multiple cable pulls in order to complete the project. The casing would be laid within the wellbore during a first pull, then the conduit pipes themselves would be pulled through the casing within the wellbore. Given the enormous cost of such a project, it is critical to avoid any unnecessary expense, and it would thus be highly desirable to develop a method of installing a group of larger conduit pipes within a wellbore without the use of an outer casing.

In addition to the problem of cost, the use of an outer casing is also impractical for certain applications. For example, in applications that involve the placement of high-voltage transmission lines, heat dissipation is a critically important factor in the design of a conduit system. The application of an outer casing would reduce the ability of the system to dissipate heat from the high-voltage cabling to the surrounding earth, thereby requiring a larger conduit for the cable than would otherwise be required. The larger conduit would increase the cost of the installation, and might make installation impractical once conduit size reached beyond a certain practical limit. Also, it is believed that it would be necessary to use a metal casing in applications of this size since other available materials would not exhibit sufficient strength to serve as the outer casing. The use of a metal outer casing would create magnetic/electrical conduction problems when used to encase a high-voltage transmission line, thus again making the use of a large outer casing impractical for this type of application.

The limitations of the prior art are overcome by the present invention as described below.

BRIEF SUMMARY OF THE INVENTION

The present invention is directed to a pipe bundle for use as conduits to carry cables through a wellbore. The pipes forming the bundle are of varying size and of a configuration so as to form a bundle that can withstand the forces related to installation in a wellbore, while including conduits of large size as required for certain applications and optimizing the electrical/magnetic characteristics of the design. In addition, the pipes are formed into a bundle by bindings periodically placed along their length so that the bundle moves and deflects as a single unit, similar to a bundle fitted into a casing. The bundling is also an aspect of the invention that reduces the forces acting on the pipes during installation. This configuration results in a group of conduits of potentially larger size, and which may be pulled through a longer wellbore to accommodate larger crossing requirements. Because no outer casing is required in this bundle configuration, the cost of installing the conduits is significantly reduced. Furthermore, since no outer casing is required, the problems related to heat dissipation or electrical/conduction issues related to the use of metal conduits are eliminated.

The present invention is further directed to a pulling head that may be attached to the conduit bundle that allows the bundle to be more easily pulled through the wellbore without undue stress on the bundle. The pulling head is designed to receive a bundle in a particular configuration. In addition, the pulling head allows for the flow of a weighting material through all of the conduits by forming a reservoir connecting all of the conduits in a fluidic fashion. The use of a weighting material reduces the force upon the bundle during installation because it prevents the buoyancy of the conduit from creating additional pressure between the top of the bundle and the top of the wellbore.

It is therefore an object of the present invention to provide for a pipeline bundle capable of withstanding greater forces during installation without the use of an outer casing.

It is a further object of the present invention to provide for a pipeline bundle for installation in a wellbore that includes pipes of varying sizes.

It is also an object of the present invention to provide for a pipeline bundle for installation in a wellbore that includes bindings.

It is also an object of the present invention to provide for a pipeline bundle pull head that is designed to receive the pipeline bundle in a particular configuration for installation in a wellbore.

It is also an object of the present invention to provide for a pipeline bundle pull head that acts as a reservoir to direct weighting material within the multiple conduits of a conduit bundle.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 5 is a table showing loading criteria for installation of a conduit bundle filled with air according to a preferred embodiment of the present invention.

FIG. 6 is a table showing loading criteria for installation of a conduit bundle filled with 12 parts per gallon (ppg) of bentonite mud according to a preferred embodiment of the present invention.

FIG. 7 is a table showing loading criteria for installation of a conduit bundle filled with water according to a preferred embodiment of the present invention.

DETAILED DESCRIPTION OF THE INVENTION

In the preferred embodiment, an HDPE pipeline bundle is installed through an HDD-created wellbore passing underneath a body of water or other obstacle. The preferred embodiment has been applied in the installation of a pipe bundle under a large river; this bundle was designed for use as conduit for both power transmission and communications cables. More specifically, the problem to be solved in developing the preferred embodiment was the passage of two circuits of three-phase, high voltage (230 kV) electrical transmission lines under a large river. In addition, three fiber optic communications cables were to be installed through the passage. The wellbore in this particular case reached a depth of 196 feet below the eastern and western banks of the river, with a total pipeline length of 3,495 feet.

Figure 1:
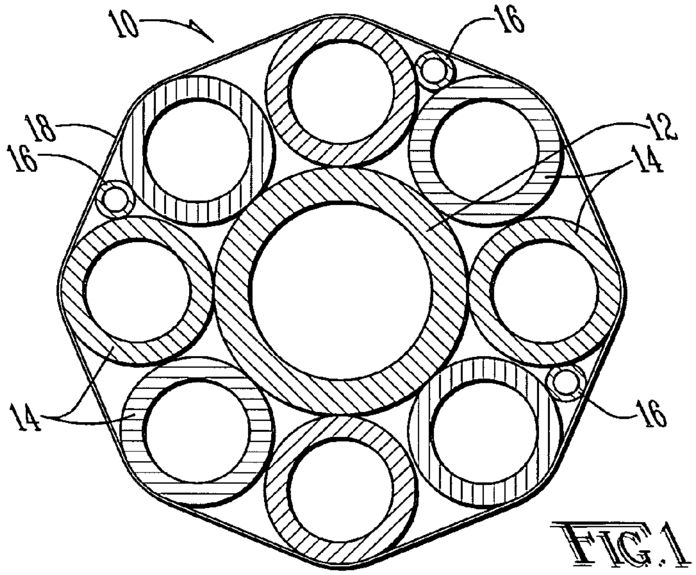
FIG. 1 is a cross-sectional view of a conduit bundle according to a preferred embodiment of the present invention.

With reference to FIG. 1, the preferred embodiment of the present invention may be described. Bundle 10 is formed of various diameters of HDPE, extra-high molecular weight (EHMS) pipe. Specifically, the pipe used is PE3408 pipe such as is available from CSR PolyPipe of Gainsville, Tex. The configuration is that of a ring of conductor pipes 14 surrounding central pipe 12, with placement of fiber optics pipes 16 in the outside spaces between conductor pipes 14.

Center pipe 12 is preferably constructed of HDPE pipe of Type DR7.2. It is believed that Type DR7.2 pipe has the thickest walls of any HDPE pipe of its diameter that is commercially available. Center pipe 12 preferably has an outside diameter (OD) of 18 inches, and an average inner diameter (ID) of 12.652 inches. Note that in the preferred embodiment, center pipe is used only for support and stability of bundle 10, and does not itself provide a conduit for any cables. In alternative embodiments, however, center pipe 12 could be used for all manner of cables, as well as the transmission of fluids or other materials by pipe, such as for the movement of natural gas, water, or sewage.

In the preferred embodiment, a total of eight conductor pipes 14 are placed in a concentric pattern around central pipe 12. Conductor pipes 14 preferably are formed of Type DR7.3 material, which it is believed provides the thickest walls of any HDPE pipe of this diameter that is commercially available. Conductor pipes 14 preferably have an OD of 10.75 inches and an average ID of 7.690 inches. Since the application of the preferred embodiment involved two circuits of a three-phase transmission line, only six of the eight conductor pipes 14 were actually used as conduit for transmission lines. The additional two conductor pipes 14 are preferably used to accommodate back-up cables in case of a cable failure. Alternatively, the additional conductor pipes 14 may be used to accommodate other types of cabling or the transmission of other fluids or materials. Although in the preferred embodiment uses eight conductor pipes 14, other types may be used as appropriate to the relative size of the pipes chosen for the implementation of central pipe 12 and conductor pipes 14.

Further in the preferred embodiment and as shown in FIG. 1, three fiber optic pipes 16 are placed in some of the outside gaps formed between adjacent conductor pipes 14. Fiber optics pipes are preferably formed of Type DR7 material, and have an OD of 2.375 inches and an average ID of 1.670 inches. It may be noted that in the preferred embodiment only three fiber optic pipes 16 were placed because the needs for fiber optics cables at this crossing were met by that number of fiber optics pipes 16. In alternative embodiments, however, up to eight fiber optics pipes 16 could be placed using the configuration of the preferred embodiment. Another alternative embodiment would make use of the space formed at the inside gaps between two adjacent conductor pipes 14, adjacent to the outer surface of central pipe 12. Using these spaces as well, up to sixteen fiber optics pipes 16 could be placed using the preferred configuration.

The pipes are bundled together using straps 18. Straps 18 are preferably formed of stainless steel strapping material, with a preferred width of 2 inches and a material thickness of 0.044 inches. The straps when positioned are approximately 96 inches long in the preferred embodiment, and are placed approximately every fifty feet along the length of bundle 10. Straps 18 may be bound about bundle 10 using any manner sufficiently strong to withstand the force of pulling bundle 10 through a borehole. Conventional strapping clips have been employed in the preferred embodiment. It may be noted that during the actual installation of the preferred embodiment, each of the straps 18 visible on the exit side of bundle 10 were shown to have survived the installation intact. It is not known whether all of the other straps 18 survived the installation, although it is believed based upon the results of the installation that most or all of straps 18 did in fact survive in place.

The use of straps 18 to keep bundle 10 together results in a bundle 10 that moves and deflects as a single unit. The shape of this unit is roughly symmetrical across any line drawn through the middle of two opposing conductor pipes 14, excepting for the placement of fiber optic pipes 16. The overall diameter of bundle 10 in the preferred embodiment, as measured from the farthest points on two opposing conductor pipes 14, is an average of about 39.5 inches. This measurement results from the binding of conductor pipes 14 tightly against central pipe 12 using straps 18.

The PE 3408 pipe used for bundle 10 is available in sections that are of a length of up to 50 feet. In order to form a continuous conduit that would reach across the span of a large river or other body or obstacle, the sections must be joined together to form a long conduit. The heat fusion method of joining HDPE pipe was employed in the preferred embodiment for this process. Heat-fusion joining is a well-known method of joining HDPE pipe for gas transmission and other applications, and has been in use for decades. In summary, the process comprises the insertion of a heating plate between the two ends to be joined; the application of force to the pipe section outer ends to apply pressure between the pipe sections and the plate; and then the rapid removal of the heated plate while force is continuously applied to the pipe section outer ends in order to bring the inner heated pipe ends together. The interior of the pipe is then reamed in order to remove the resulting interior bead, which would otherwise reduce the effective inside diameter of the conduit. The exterior bead is generally left intact, although this bead may be removed if desired by means of knives or the like. The process thus results in a fused joint between two pipe ends that is of a strength approximately equal to that of the original pipe walls themselves.

Although not shown in FIG. 1 for clarity, the power cables deployed in the preferred embodiment are 230 kV single conductor cross-linked polyethylene (XLPE) insulated, lead sheathed transmission and distribution cables. Such cable has been manufactured by Sumitomo Electric Industries, Ltd. of Japan. The lead or lead alloy sheath is preferably a continuous and seamless extruded material applied over water barrier/bedding tape around the insulated shielding of the cable. Since in the preferred embodiment two three-phase 230 kV transmission lines are to be installed through the bundle, a total of six conductor pipes 14 are required. Additional cabling may be installed in the additional two conductor pipes 14 to serve as emergency back-up cables in the event of a problem with an existing cable. Additionally, terminations appropriate for 230 kV cable outdoor substation use are installed, along with appropriate lightning arresters. Testing for the conductor cables according to the preferred embodiment included a jacket integrity test at 10 kV for ten minutes, and, upon successful completion of the integrity test a water soak test at 230 kV conducted for twenty-four hours.

Also not shown in FIG. 1 for clarity, the fiber optic cables deployed in the preferred embodiment preferably comprise single-mode optical fibers built to SMF-28E standard. SMF-28E cable is produced by Corning Incorporated of Corning, N.Y. Typical parameters for this cable include a core diameter of 8.2 microns and a cladding diameter of 125 microns, with a concentricity error of less than 0.5 microns. The fiber optic cables preferably consist of 96 optical fibers each, stranded together with fillers to form a core unit. The fibers are formed into 8 tubes, with 12 fibers in each tube, each tube having a preferred diameter of 0.732 inches. The cables are preferably coated with a polyethylene jacket for protection.

Figure 2:
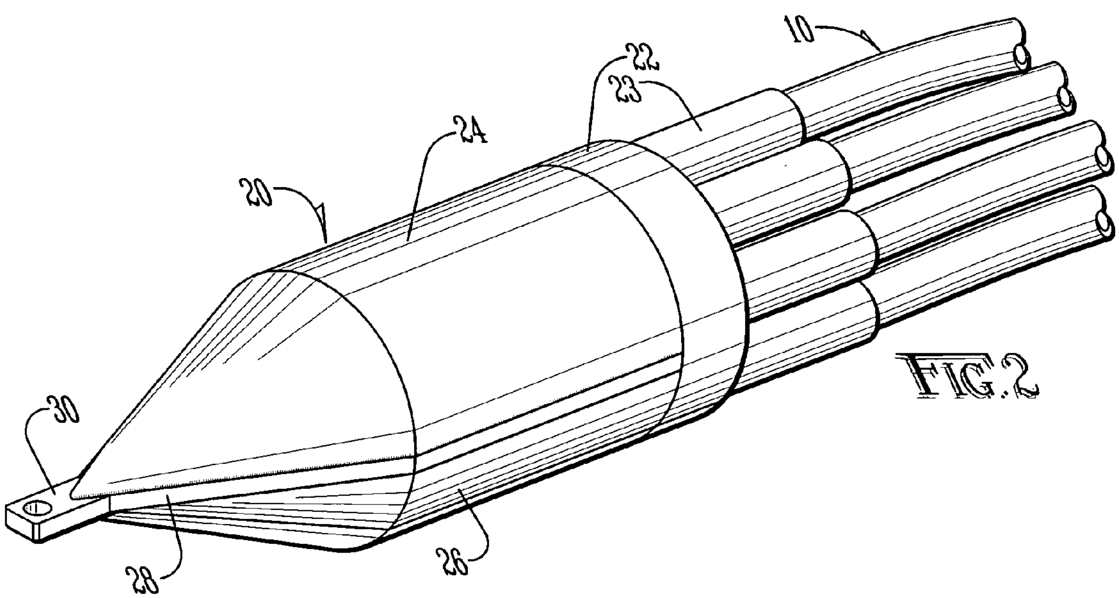
FIG. 2 is a cross-sectional view of a pulling head for a conduit bundle according to a preferred embodiment of the present invention.
Figure 3:
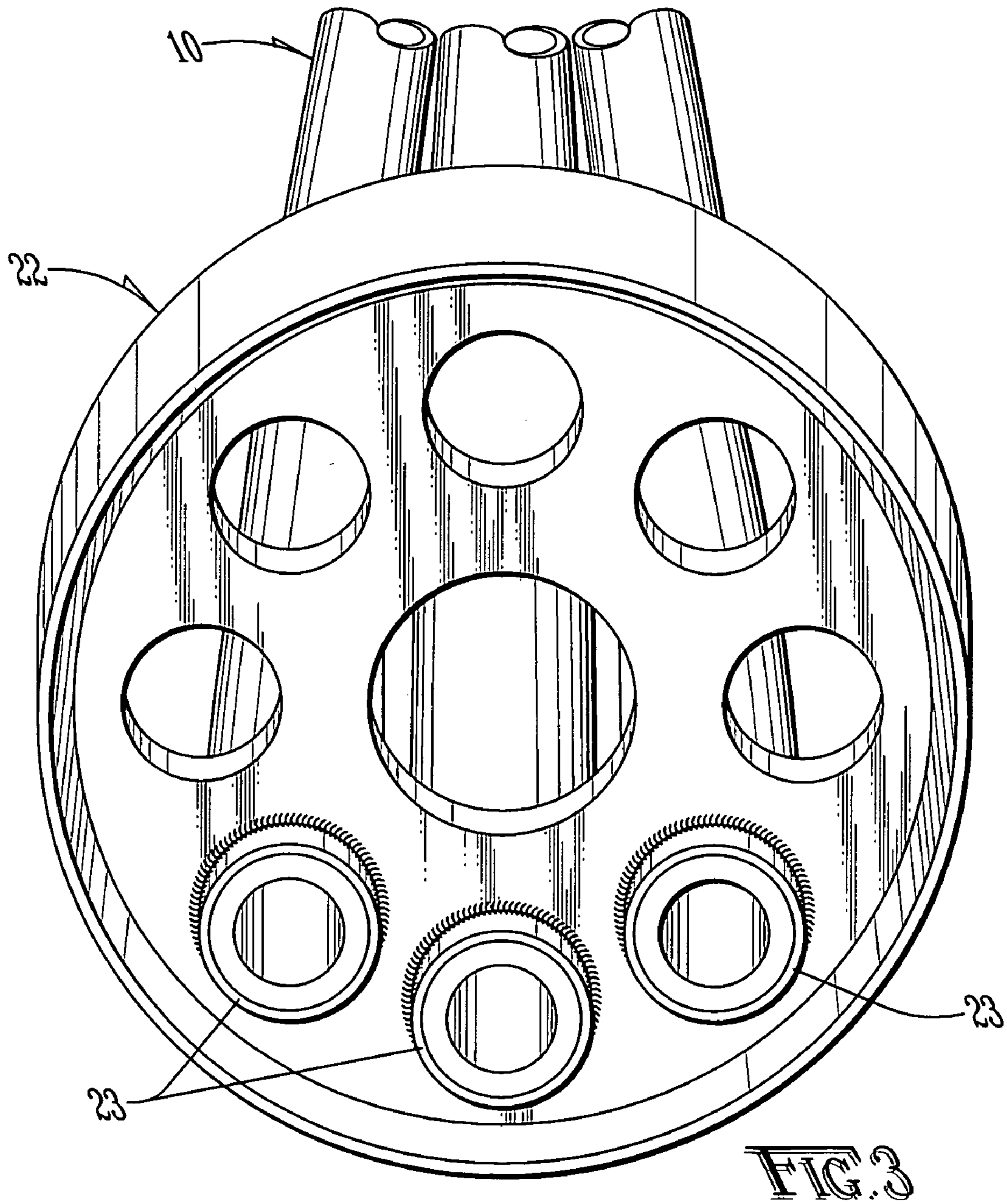
FIG. 3 is an end view of a pulling head for a conduit bundle according to a preferred embodiment of the present invention.

Referring now to FIGS. 2 and 3, the construction of pulling head 20 may be described. As explained previously, pulling head 20 is attached to bundle 10 during installation of bundle 10 through the wellbore resulting from HDD techniques. At the rear of pulling head 20 is base 22, which comprises a series of holes sized and positioned to receive compression fittings 23. Compression fittings 23 connect base 22 with central pipe 12 and each of the eight conductor pipes 14, and thus there are nine compression fittings 23 in the preferred embodiment (some of compression fittings 23 are omitted for clarity in FIG. 3). Each compression fitting 23 comprises a steel tube into which a short piece of HDPE pipe is inserted and connected by pressure. The steel tube of each compression fitting 23 is welded into place at base 22, while the HDPE pipe section of each compression fitting 23 is left for connection with the corresponding central pipe 12 or conductor pipe 14 using the heat fusion method as described previously. Welded to base 22 are top cone half 24 and bottom cone half 26. Between top cone half 24 and bottom cone half 26 is pulling plate 28. Pulling plate 28 bisects the hollow interior formed by top cone half 24 and bottom cone half 26, and includes lug 30 at which the pulling cables may be attached to pulling head 20. Pulling plate 28 provides the necessary strength and rigidity to withstand the pulling force applied to pulling head 20. Each of base 22, top cone half 24, bottom cone half 26, and pulling plate 28 are preferably formed of steel, although alternative embodiments might use substitute metals or other materials of sufficient strength to withstand the forces exerted upon pulling head 20 during installation of bundle 10.

It will be noted in FIGS. 2 and 3 that pulling head 20 defines a hollow cavity, bisected by pulling plate 28 but open at the rear such that fluid may flow between the encapsulated ends of central pipe 12 and conductor pipes 14. In this manner it will be seen that fluid may be forced into central pipe 12, pass into the cavity within pulling head 20, and then be forced into each of conductor pipes 14. Pulling head 20 thus forms a reservoir that fluidically connects central pipe 12 and conductor pipes 14. This arrangement allows each of the larger conduits of bundle 10 to be easily filled with liquid during installation. The use of a liquid is advantageous as for the reasons as will be described below.

Figure 4:
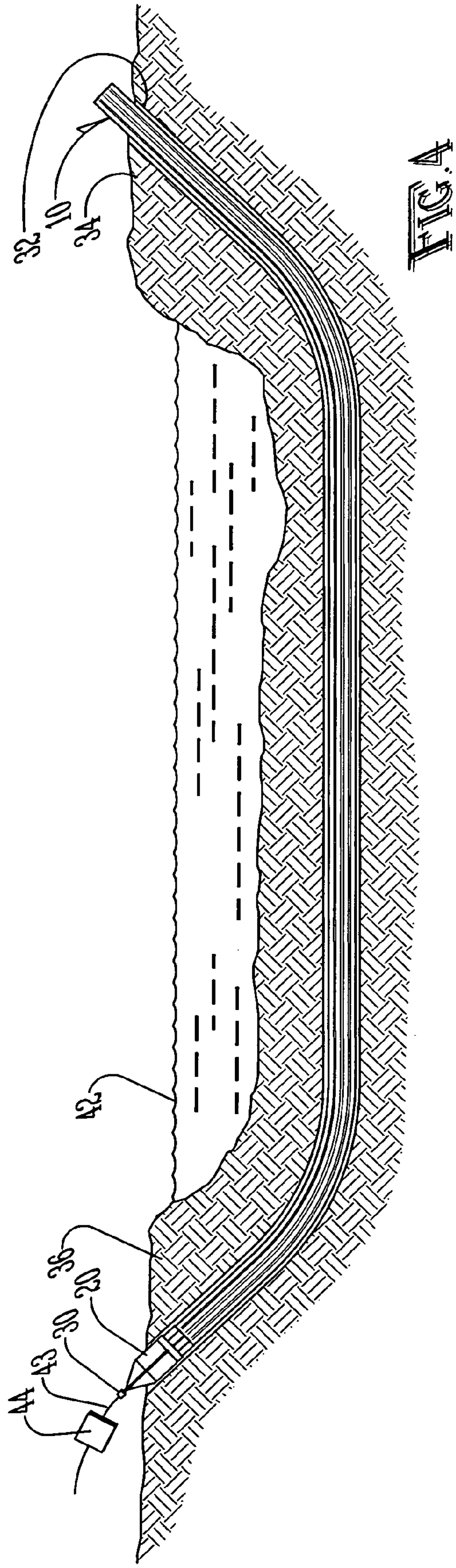
FIG. 4 is a elevational view of a conduit bundle installation according to a preferred embodiment of the present invention.

The installation process for bundle 10 may now be described, with reference to FIG. 4. Bundle 10 is to be installed through wellbore 32, which passes under river 42 from west bank 36 to east bank 34. At east bank 34, the pipe segments are formed into central pipe 12, conductor pipes 14, and fiber optics pipes 16 of sufficient length using the heat fusion method as described above. In the application of the preferred embodiment described herein, the total length required for each of central pipe 12, conductor pipes 14, and fiber optics pipes 16 was 3650 feet. The pipes are then bound into bundle 10 using straps 18. Again, in the application of the preferred embodiment, a total of approximately 480 bands were used.

Because the total weight of bundle 10 will be considerable when bundle 10 is of such a great length, some means must be provided to support bundle 10 on the inlet side of the installation area. In the preferred embodiment, a series of steel rollers (not shown) are supplied at east bank 34 to support bundle 10 along its length. Over 300 such rollers were employed in the application of the preferred embodiment. As part of the bundling process according to the preferred embodiment, pulling head 20 is attached to the front end of bundle 10 by means of compression fittings 23 as previously described. Welding or other appropriate means of attaching pulling head 20 and bundle 10 as will be capable of withstanding the forces applied during installation may be employed in alternative embodiments. It may be noted that in the preferred embodiment, central pipe 12 and conductor pipes 14 are attached to base 22 of pulling head 20 by means of compression fittings 23, whereas fiber optics pipes 16 are not directly connected to pulling head 20. In alternative embodiments, fiber optics pipes 16 could also be connected to pulling head 20 by means of compression fittings 23, or by other methods. According to the preferred embodiment, pulling head 20 is formed such that its maximum outside diameter is roughly 44 inches.

The HDD drilling process begins at west bank 36 with the drilling of a small diameter pilot hole using drilling line 43 (the HDD drilling machinery is not shown for clarity). The HDD operator may then guide the drilling head attached to drilling line 43 along the desired path, passing through the ground at west bank 36, under the bed of river 42, and surfacing on east bank 34 at the point where pulling head 20 is intended to enter the ground. In the application of the preferred embodiment, the first pilot hole is drilled to a diameter of 24 inches. The drill is then withdrawn, and a larger cutting head is attached to drilling line 43, this time creating a hole that is of a diameter of 36 inches. A "swab," or plug-type reamer, of appropriate size may then be drawn through the hole on drilling line 43 in order to clear debris. The plug consists of a steel cylinder attached to drilling line 43. Again according to a preferred embodiment of the invention, this process is repeated with a 48-inch diameter cutting head, another swab, and then finally a 54-inch diameter drilling head followed by two swabbing steps with 54-inch diameter plug 44. The result is wellbore 32, which in the preferred embodiment is roughly 54 inches in diameter, thereby allowing significant clearance beyond the diameter of pulling head 20 at 44 inches. This clearance will minimize the friction encountered when pulling head 20 and bundle 10 are drawn through wellbore 32, while keeping the diameter of wellbore 32 to the minimum size as may reasonably accommodate bundle 10. It may be noted that during the drilling and installation process, wellbore 32 is protected from collapse by the infusion of bentonite mud pumped into wellbore 32, as is known in the HDD art.

Upon completion of the final swabbing step at 54 inches of diameter with plug 44, drilling line 43 is attached to lug 30 at pulling head 20 and drawn back through wellbore 32. It may be noted that in the preferred embodiment, plug 44 is retained on drilling line 43 in order to further provide clearance of debris just in front of pulling head 20 during installation of bundle 10. Alternative embodiments may omit plug 44. Drilling line 43 is then used to draw pulling head 20 from east bank 34 through wellbore 32 under river 42 until pulling head 20 surfaces at west bank 36. In the application of the preferred embodiment, an HDD pulling rig was employed with a maximum pulling capacity of 460,000 pounds. HDD services utilizing this type of equipment are available from Sunland Construction, Inc. of Eunice, La.

It may be noted that each of central pipe 12 and conductor pipes 14 are preferably filled with water during installation. The purpose of the water fill is to prevent friction that would otherwise be caused by the natural buoyancy of the HDPE pipe when filled with air; this effect is described in the modeling analysis provided hereafter. Pressurized water is introduced into the back end of central pipe 12, thereby filling central pipe 12. Because each of conducting pipes 14 are connected to central pipe 12 and each other in a fluid manner through the reservoir formed by the hollow interior of pulling head 20, water may flow out of the front end of central pipe 12, into the hollow reservoir within pulling head 20, and then back through each of conducting pipes 14. The back end of conducting pipes 14 may then be capped in the preferred embodiment to hold water within bundle 10 during installation.

Upon completion of the installation process, a gauging pig may be run through each of central pipe 12, conductor pipes 14, and fiber optic pipes 16 in order to ensure that the pipes have not become deformed during installation. Gauging pigs for this purpose are known in the art. After installation and testing is complete, each of central pipe 12, conductor pipes 14, and fiber optic pipes 16 may be preferably filled with clean, potable water and sealed at both ends, in preparation for cable installation. Termination structures may preferably be constructed then in order to hole bundle 10 in place at each of east bank 34 and west bank 36. Riprap is preferably placed at each of the terminations, the preferred form being R-300 granite or limestone type, broken stone and irregular-shaped rock, solid and nonfriable.

A series of mathematical models were performed with respect to the assembly formed by bundle 10 and pulling head 20 in order to determine if bundle 10 could be successfully installed. Specifically, the models were used to determine if the tension required to pull bundle 10 through wellbore 32 would create stress levels that would exceed the design limits for HDPE pipe. The model used for this purpose is outlined in "Installation of Pipelines by Horizontal Directional Drilling: An Engineering Design Guide," J. D. Hair et al., Stress Engineering for the Pipeline Research Committee at the American Gas Association, Apr. 15, 1995, which is incorporated by reference herein. The model incorporates important factors such as axial tension, frictional drag due to wetted friction between bundle 10 and the wall of wellbore 32, fluidic drag due to mud pumped into wellbore 32, weight effects, bending around curved sections, and the effect of a pressure differential across bundle 10. While the model presented in the referenced paper is designed for two-dimensional analysis, the application at issue included an azimuthal angle due to the projected path of bundle 10 in the application of the preferred embodiment, and thus the model was extended to three dimensions. The model was also modified to take into account the yield strength for the HDPE pipe forming central pipe 12, conductor pipes 14, and fiber optic pipes 16.

For straight horizontal or angled pipe sections, the model sums the individual forces acting on bundle 10. These include the tension at the beginning and end of the section, the fluidic drag, the frictional drag, and the normal forces. For curved sections, the model includes similar relationships for the drag and friction terms. The change in tension around a curved section is also included in the analysis. Additionally, to determine the effect of the curvature on the normal forces and the bending stresses in bundle 10, bundle 10 is modeled as a beam in three-point bending. The beam model incorporates the radius of curvature of wellbore 32 and calculates the normal forces required for bundle 10 to obtain this shape. The normal forces are used along with the friction coefficient to estimate the frictional forces for this curved section of bundle 10.

The relatively low density of HDPE causes bundle 10 to have a negative effective weight within wellbore 32, such that it floats. This effect will occur even if each of the pipes forming bundle 10 are filled with 12 ppg mud, since the wellbore in the preferred embodiment is itself filled with 12 ppg mud. When the pipes of bundle 10 are filled with air, the negative effective weight is even larger, and this negative weight increases the drag on the pipe because the drag is proportional to the normal force between bundle 10 and the upper portion of the wall of wellbore 32. Replacing the air with water as a fill material for the pipes of bundle 10 reduces the normal force significantly, since water has a much higher density of 62.4 pounds per cubic foot.

The loading condition along the pipes of bundle 10 originates from a superposition of axial loading; radial loading due to differential pressure across the pipe walls; hoop (or circumferential) loading due to differential pressure across the pipe walls; three-point bending due to bundle 10 going around both inclination and azimuthal angles; and hoop and radial loading due to the tensioned straps 18 bundling the pipes of bundle 10 together. The differential pressure across the walls of central pipe 12, conductor pipes 14, and fiber optics pipes 16 individually is a function of the external and internal contents and the depth. Twelve ppg mud is external to all the pipes of bundle 10, while several internal contents were examined including air, water, and 12 ppg mud. Thus the differential pressure always creates radial and hoop compression in the pipes making up bundle 10.

Some tension was required to pull bundle 10 to the entry point on east bank 34. This loading was taken to be 12 kips based on the air weight of bundle 10 multiplied by about 200 feet of pipe multiplied by a coefficient of friction of 0.3. This load was modeled as a constant independent of the actual pulled length of bundle 10. It is likely that this tension requirement will be a maximum at the beginning of the pull and be a minimum when most of bundle 10 is in wellbore 32.

The loading is assumed to be shared equally among central pipe 12, conductor pipes 14, and fiber optic pipes 16. If one pipe carries more of the axial load, single pipe failure could result and lead to progressive failure of the other pipes. The load sharing is assisted by banding 18 that should ensure that the pipes strain axially as a bundle.

Two effects create drag on bundle 10 being pulled through filled wellbore 32. Both of these forces always oppose the motion of bundle 10. While most of the other input parameters are well defined, the drag and friction coefficients are unknown. Thus the final results will show a range based on prudent estimations of the unknowns. The first unknown is fluidic drag. As a body moves through a fluid, drag is created based on the viscosity and density of the fluid, the geometry of the body, the Reynolds number, and the speed of the body. An estimate of the fluidic drag was made and found to be between 0.01 to 0.08 psi. The fluidic drag is proportional to the square of the speed at which bundle 10 is pulled; higher speeds create more drag and more loading on bundle 10.

The second unknown is the friction between bundle 10 and the wall of wellbore 32. The friction at the interface is modeled as the product of the normal force and the coefficient of friction. The coefficient of friction is the average or global coefficient of friction since irregularities in wellbore 32, the presence of periodic straps 18 on bundle 10, and other situations create non-uniform sliding resistance. The range of coefficients examined varied from 0.10 to 0.50. For comparison, the coefficient of friction of steel on steel is around 0.3 and masonry on moist clay is 0.33. A commonly accepted coefficient of friction value between HDPE pipe and a conduit full of water is 0.1.

The model uses installation design criteria based on one-third of the yield strength of the HDPE material. This value originates from a desire to limit the strain in the material to 5 percent over a 12-hour period. Due to creep in the plastic, it is not generally recommended to remain at high stress (or strain) levels for extended periods of time. For time durations between 1 hour and 24 hours, which were expected with respect to installation of bundle 10, the safe pull stress is believed to be around one-third of the yield strength. It may be noted that in the application of the preferred embodiment, the actual pull duration was about 17 hours.

The design criteria were checked for each section in the model. The criteria included individual checks on the tension plus bending stress, hoop buckling stress, and combined von Mises equivalent stress.

The hoop buckling stress ($f_h$) should be less than yield strength divided by $N \times f_R \times f_O$, where:

- $f_h$ is found from the thick-wall solution to a cylinder with internal and external pressure;
- N is a factor of safety taken to be 3. ASTM F1962 recommends N to be 2 or higher;
- $f_O$ is the ovality correction factor based on 2% ovality and calculated based on ASTM F1962; and
- $f_R$ is the axial tension correction factor from ASTM F1962.

The reduction in collapse strength for polyethylene pipe is due to axial tensile loading having a tendency to reduce the pipe's short-term resistance to collapse under external pressure. For an axial stress equal to half of the design stress limit, this factor equals 0.85.

The combined tension and bending ($f_t+f_b$) should be less than yield strength divided by 3, where:

- $f_t = T/A$ (axial tension divided by cross sectional area);
- $f_b = (E \times c)/R$; and
  - E is the modulus of elasticity of the HDPE material;
  - c is the distance from the neutral axis to the farthest ligament on the pipe of interest; and
  - R is the radius of the curve.

The von Mises stress should be less than yield strength divided by 3. The von Mises stress may be expressed as:

$$\frac{1}{\sqrt{2}}\left[(f_t+f_b-f_h)^2+(f_t+f_b-f_r)^2+(f_r-f_h)^2\right]^{1/2}$$

where $f_r$ is the radial stress from thick-wall solution to a cylinder with internal and external pressure.

Figure 8:
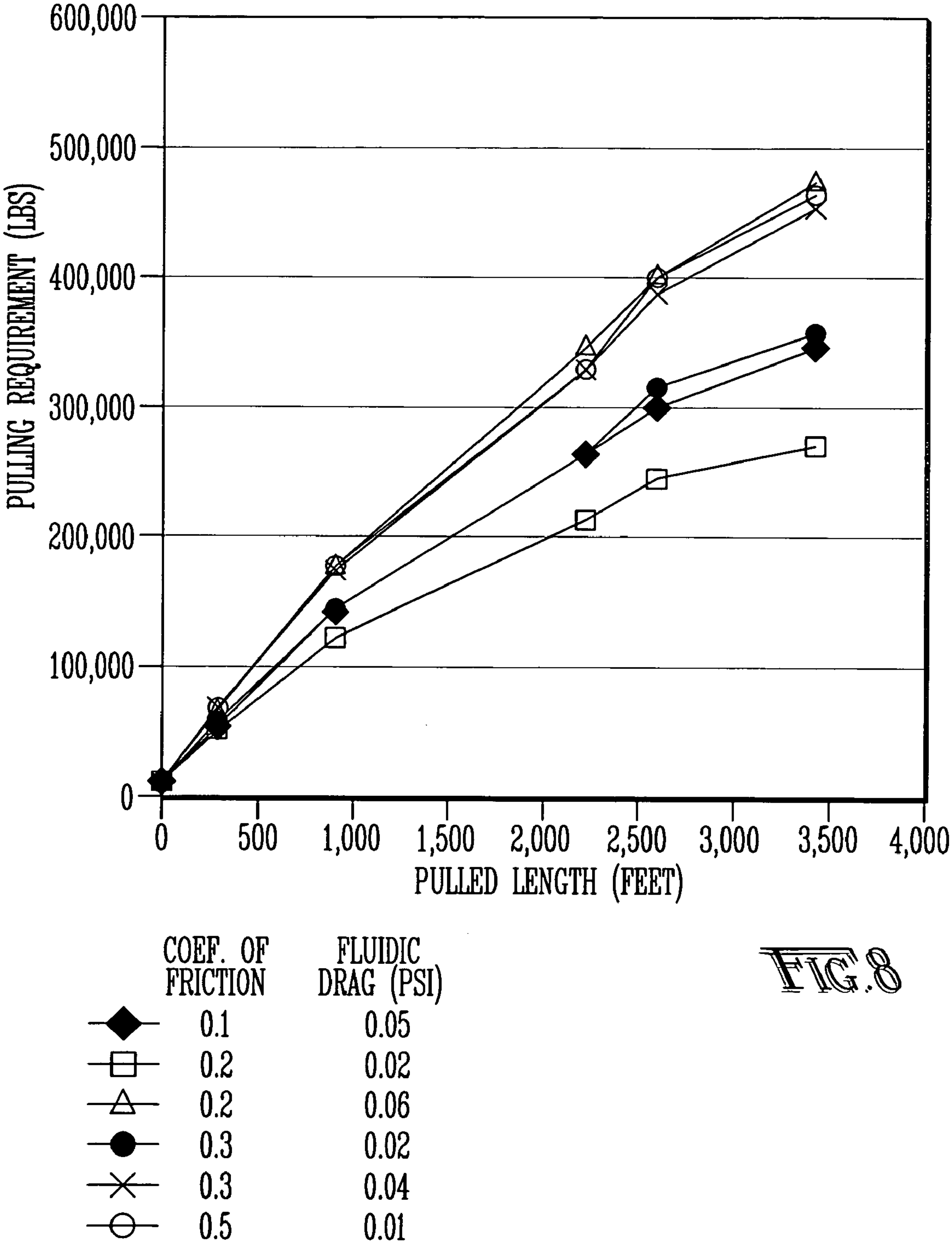
FIG. 8 is a chart showing the pulling force requirements during installation of a conduit bundle filled with water for various bundle lengths according to a preferred embodiment of the present invention.

The results showed that the forces acting on bundle 10 overall were governed by the axial tension at the exit point on west bank 36. The bending stresses were around 10 percent of one-third of yield because of the large radii. For bundle 10 filled with air the hoop stresses reached almost 70 percent of one-third of the yield strength. This value decreased to around 40 percent when the pipe bundle was filled with water due to the decrease in the pressure differential across the pipe wall. Tabulated analysis results are shown in FIG. 5 for bundle 10 filled with air, FIG. 6 for bundle 10 filled with water, and FIG. 7 for bundle 10 filled with 12 ppg mud. FIG. 8 shows the variation of applied load as a function of pulled distance for a series of modeled cases in which bundle 10 is modeled as having been filled with water.

As a result of this analysis, it may be seen that unless the coefficient of friction is very small, the pipes forming bundle 10 could not have been filled with air during the installation due to the excessive upward buoyant force creating significant drag, and thus requiring more tension than bundle 10 could sustain per the installation design criteria. A coefficient of friction of 0.3 or greater would not allow bundle 10 to be installed when filled with air. Filling bundle 10 with water did allow bundle 10 to be pulled through wellbore 32. The unknown variables in the model relate to the sliding resistance of the pipe. As shown in FIG. 7, if the coefficient of friction between bundle 10 and the soil in wellbore 32 is greater than 0.5, the design criteria is met only if the fluidic drag is very small.

Calculations were also made to determine the minimum allowable bending radius of bundle 10. In addition to bending in wellbore 32, these results are of interest for an understanding of the handling requirements of the bundle 10 prior entering wellbore 32. If bundle 10 is bent to a radius less than the minimum allowable during installation, one or more of the pipes forming bundle 10 may yield. The results of these calculations showed that the minimum allowable bending radius for the preferred embodiment was 192 feet. At a radius of 192 feet, the stress on conducting pipes 14 reaches one-third of the material yield strength. It should be noted that this calculation does not include any other stresses on bundle 10, such as hoop stress or axial tension. Central pipe 12 was shown not to yield until the radius drops to 87 feet. Analyzed as single pipes (that is, non-bundled), the minimum bending radii for conducting pipes 14 and central pipe 12 were shown to be 52 and 87 feet, respectively.

As a result of this analysis, several points present themselves. First, due to creep in the HDPE material, it is critical that bundle 10 not remain at high stress (or strain) levels for extended periods of time. Conversely, however, the fluidic drag is proportional to the square of the speed at which bundle 10 is pulled, and thus the velocity at which pulling is performed must be limited. The load cannot exceed 572 kips at any time without surpassing the one-third yield strength criteria. If the load at 1000 feet is 175 kips or less, bundle 10 according to a preferred embodiment of the invention may be installed with safety.

Due to the earth and groundwater pressures as explained above, conducting pipes 14 of bundle 10 will exhibit a tendency to deflect. This tendency is referred to as ring deflection. It is believed that the deflection may be as much as 0.5 inches for conducting pipes 14 in the preferred embodiment. Because of this circumstance, the inside diameters of each of conducting pipes 14 were verified to be of the desired minimum width after installation. In the case of the preferred embodiment, the manufactured ID of each of conducting pipes 14 was about 7.690 inches, and the minimum allowed verified diameter was set to be seven inches. It may be noted that results from application of the preferred embodiment showed that no part of any conducting pipe 14 had deflection that exceed the seven-inch diameter minimum.

The present invention has been described with reference to certain preferred and alternative embodiments that are intended to be exemplary only and not limiting to the full scope of the present invention as set forth in the appended claims.

What is claimed is:

1. A conduit for installation in a wellbore without an outer casing, wherein said conduit comprises:

(a) a central pipe;

(b) a plurality of peripheral pipes longitudinally parallel to said central pipe and externally adjacent to said central pipe;

(c) at least one interstitial pipe longitudinally parallel to said central pipe and said plurality of peripheral pipes and located externally adjacent to at least one of said plurality of peripheral pipes; and (d) a plurality of bands wrapped circumferentially around said peripheral pipes whereby said central and peripheral pipes are bound together by said bands to form the bundle, wherein an outer diameter of at least one of said peripheral pipes is less than an outer diameter of said central pipe, and wherein each of said plurality of peripheral pipes is adjacent to two other of said plurality of peripheral pipes.

2. The conduit of claim 1, wherein an outer diameter of said at least one interstitial pipe is less than an outer diameter of at least one of said peripheral pipes.

3. The conduit of claim 2, further comprising a central pipe longitudinal axis, a plurality of peripheral pipe longitudinal axes, and at least one interstitial pipe longitudinal axis, and wherein at least one of said peripheral pipe longitudinal axes is closer to said central pipe longitudinal axis than said at least one interstitial pipe longitudinal axis.

4. The conduit of claim 3, further comprising a plurality of peripheral pipe outer surfaces and at least one interstitial pipe outer surface, and wherein a farthest point on said interstitial pipe outer surface is no farther from said central pipe longitudinal axis than a farthest point on at least one of said peripheral pipe outer surfaces.

5. The conduit of claim 4, wherein said bands are in contact with at least one of said plurality of peripheral pipe outer surfaces and said at least one interstitial pipe outer surface.

6. The conduit of claim 1, wherein said central pipe and said plurality of peripheral pipes are formed of high-density polyethylene (HDPE).

7. The conduit of claim 1, wherein said bands are formed of stainless steel.

8. A conduit for installation in a wellbore without an outer casing, wherein said conduit comprises:

(a) a central pipe;

(b) a plurality of peripheral pipes longitudinally parallel to said central pipe and externally adjacent to said central pipe; and (c) a pulling head attached to said central pipe and said peripheral pipes wherein said pulling head comprises a passage between an interior of said central pipe and an interior of at least one of said peripheral pipes whereby liquid may flow from within said central pipe to within at least one of said peripheral pipes, wherein said central and peripheral pipes are bound together to form a bundle.

9. A pipeline bundle for installation in a wellbore without an outer casing, wherein said bundle comprises:

(a) a central pipe;

(b) a plurality of peripheral pipes disposed circumferentially around said central pipe; and (c) a pulling head attached to said central pipe and said peripheral pipes wherein said central pipe comprises a central pipe interior and each of said peripheral pipes comprise a peripheral pipe interior, and wherein said pulling head further defines a passage between said central pipe interior and at least one of said peripheral pipe interiors whereby liquid may flow from within said central pipe to within at least one of said peripheral pipes.

10. A conduit for underground installation, the conduit comprising:

(a) a plurality of pipes, each of said pipes defining an interior, wherein said pipes are aligned longitudinally parallel with respect to and adjacent to each other thereby forming a bundle having two ends; and (b) a pulling head attached to one of said ends of said bundle, wherein said pulling head defines a passage between said interior of at least one of said plurality of pipes to an interior of at least one other of said plurality of pipes forming said bundle.

11. The conduit of claim 10, further comprising a plurality of bands wrapped circumferentially around said pipes whereby said pipes are bound together.

12. The conduit of claim 11, wherein said bands are formed of stainless steel.

13. The conduit of claim 10, wherein at least one of said pipes is formed of high-density polyethylene (HDPE).

14. The conduit of claim 13, wherein at least one of said HDPE pipes comprises a plurality of pipe segments fused together.

15. The conduit of claim 10, wherein said passage is filled with a liquid.

16. The conduit of claim 10, wherein at least one of said pipes comprises a first diameter, at least one other of said pipes comprises a second diameter, and said first diameter is larger than said second diameter.

17. The conduit of claim 16, wherein at least one other of said pipes comprises a third diameter, and said third diameter is smaller than said first diameter and said second diameter.

18. The conduit of claim 10, wherein said bundle comprises a bundle cross-section that is approximately circular.

* * * * *